United States Patent [19]

Wurmb et al.

[11] 3,963,669

[45] June 15, 1976

[54] GLASS-FIBER-REINFORCED POLYESTER MOLDING COMPOSITIONS OF REDUCED FLAMMABILITY

[75] Inventors: Rolf Wurmb, Heidelberg; Joachim Kunde, Frankenthal; Wolfgang Seydl, Hamburg, all of Germany

[73] Assignee: BASF Aktiengesellschaft, Ludwigshafen (Rhine), Germany

[22] Filed: Feb. 13, 1975

[21] Appl. No.: 549,659

[52] U.S. Cl. .................. 260/40 R; 260/DIG. 24
[51] Int. Cl.² .................. C08K 3/34; C08K 3/40
[58] Field of Search .................. 260/40 R, DIG. 24

[56] References Cited
UNITED STATES PATENTS

| | | | |
|---|---|---|---|
| 3,479,318 | 11/1969 | Jackson et al. | 260/40 R |
| 3,516,957 | 6/1970 | Gray et al. | 260/40 R X |
| 3,671,487 | 6/1972 | Abolins | 260/40 R |
| 3,751,396 | 8/1973 | Gall | 260/40 R |
| 3,859,246 | 1/1975 | Jackson et al. | 260/40 R |

Primary Examiner—Donald E. Czaja
Assistant Examiner—S. M. Person
Attorney, Agent, or Firm—Johnston, Keil, Thompson & Shurtleff

[57] ABSTRACT

Glass-fiber-reinforced molding compositions of reduced flammability consisting of (A) a linear saturated polyester resin, (B) from 10 to 60 per cent by weight of glass fibers and (C) from 3 to 30 per cent by weight of a flame retardant. The compositions contain from 2 to 20 per cent by weight, based on the total weight of the molding composition, of a particulate water-insoluble silicate having a bulk density of more than 100 g/l, which prevents dripping of the composition when in contact with an open flame.

4 Claims, No Drawings

GLASS-FIBER-REINFORCED POLYESTER MOLDING COMPOSITIONS OF REDUCED FLAMMABILITY

This application discloses and claims subject matter described in German Patent Application No. P 24 08 531.2, filed Feb. 22, 1974, which is incorporated herein by reference.

This invention relates to glass-fiber-reinforced polyester molding compositions containing conventional flame retardants for reducing the flammability and blended with silicates for the purpose of preventing dripping of the molding compositions when in contact with an open flame.

It is well known that the mechanical properties and in particular the rigidity of polyester molding compositions may be improved by the addition of glass fibers. However, this in itself increases the flammability of the molding compositions. For this reason, glass-fiber-reinforced polyester molding compositions have been blended with a variety of flame retardants, particularly those based on halogen or phosphorus compounds. Although this leads to a reduction in the flammability of the molding composition, it also causes a relatively low-viscosity melt to be formed when the molding composition is in contact with an open flame and this leads to dripping of burning material, which, on falling onto other materials, may ignite the same, if flammable. Such release of burning drops of material mainly occurs on relatively thin molded articles of glass-fiber-reinforced polyester molding compositions.

To prevent the above phenomenon, German Published Application No. 2,158,432 proposes the addition of an aromatic halide as a flame retardant and long-fiber reinforcing fillers, preferably asbestos, to glas-fiber-reinforced polyester molding compositions. However, asbestos fibers suffer from the serious drawback of involving toxic hazards.

German Published Application No. 2,243,509 proposes to prevent dripping of burning material by the addition of finely divided colloidal silicon dioxide. However, this has a low bulk density and is therefore very voluminous and thus difficult to meter with the result that great difficulties occur in the incorporation thereof into molten polyesters using conventional processing machines.

Also, German Published Application No. 2,226,931 proposes blending glass-fiber-reinforced polybutylene terephthalate, which contains a specific combination of flame retardants, with silicic acid derivatives such as surface-active silicon dioxide or oligomeric sodium silicate. When oligomeric sodium silicate is incorporated in polyester molding compositions, undesirable degradation occurs leading to considerable reduction in viscosity and impairment of the mechanical properties.

It is an object of the present invention to provide an additive for flameproofed glass-fiber-reinforced polyester molding compositions, by means of which additive dripping of burning material is prevented without occurrence of the above disadvantages.

This object is achieved in accordance with the present invention by the use of from 2 to 10 per cent by weight, based on the total weight of the moldng composition, of a particulate water-insoluble silicate having a bulk density of more than 100 g/1.

For the purposes of the present invention, the preferred linear saturated polyester is polybutylene terephthalate, although the additives are also effective in the case of polyethylene terephthalate and polypropylene terephthalate. The polybutylene terephthalate should be mainly formed from terephthalic acid and 1,4-butanediol, although up to 15 per cent molar of the terephthalic acid may be replaced by other dicarboxylic acids such as isophthalic, naphthalenedioic, adipic or sebacic acid, and up to 15 per cent of the butanediol may be replaced by other glycols such as ethylene glycol or propylene glycol. The K-value of the polyesters (as measured by the method proposed by H. Fikentscher in Cellulosechemie 13 (1952), p. 58, at 25°C at a concentration of 0.5 g in 100 ml of a mixture of phenol and o-dichlorobenzene) should preferably be from 55 to 80 and in particular from 60 to 75.

The glass fibers used for reinforcement may be in the form of chopped strands or of endless rovings. They may be pretreated with conventional sizes and adhesion promoters based on organosilanes such as glycidoxypropyltriethoxy silane. The average length of the glass fibers in the mixture is preferably from 0.05 to 1 mm and more preferably between 0.10 and 0.4 mm. They are used in amounts of from 10 to 60% and preferably from 10 to 35%, by weight, based on the molding composition. Suitable flame retardants are all conventional flameproofing agents used in amounts of from 3 to 30% and preferably from 5 to 15%, by weight of the molding composition. Suitable compounds are for example aromatic bromine compounds such as decabromodiphenyl oxide, hexabromo- or octabromodiphenyl in amounts of from 5 to 20% together with from 2 to 10% of a synergistic compound, particularly antimony trioxide; adducts of chlorine-substituted cyclic diolefins such as hexachlorocyclopentadiene with other cyclic unsaturated compounds such as cyclooctadiene or furan, these flame retardants also being used preferably together with antimony trioxide acting as synergistic agent; and phosphorous compounds such as red phosphorus, organic derivatives of phosphoric acid or phosphorous acid, and compounds showing phosphorous-nitrogen bonds.

Other useful flame retardants and combinations thereof with synergistic agents are listed in the German published applications cited above.

To prevent dripping of burning material, the molding compositions contain, according to the invention, from 2 to 10 per cent and preferably from 3 to 6 per cent, by weight, of a particulate water-insoluble silicate having a bulk density of more than 100 and preferably of more than 200 g/l. The silicates should be used in the form of fine particles, for example in the form of powders, granules, flakes, small spheres or short fibers. The invention excludes the use of relatively long fibers having an l/d-ratio of more than 50 : 1. The widest portions of the particles should show a diameter of less than 40 $\mu$m and preferably less than 10 $\mu$m. Examples of suitable additives are:

kaolin having a bulk density of about 500 g/1,
calcined kaolin having a bulk density of about 450 g/l,
talcum having a bulk density of 250 g/l,
bentonite having a bulk density of 500 g/l and
glass spheres having a bulk density of 1,400 g/l.

Apart from the last-named ingredient, the additives are naturally occurring silicates, and these are the preferred ingredients for the purposes of the present invention.

Particularly suitable are those silicates onto which the synergistic antimony trioxide has been precipitated. Furthermore, the silicates may be treated with adhesion promoters based on silanes in the same way as the glass fibers.

In addition to the above additives, the molding compositions of the invention may contain conventional stabilizers, processing auxiliaries, lubricants, dyes and pigments. Incorporation of the additives into the polyester molding compositions may be effected with conventional machines such as extruders, rollers or kneaders. It is sometimes advantageous to premix the additives or form a masterbatch of the additives in small amounts of the molding composition and then to add said mixture to the bulk of the plastics molding composition.

In the following Examples the parts and percentages are by weight.

EXAMPLE 1

Polybutylene terephthalate having a K value of 72 is melted in a twin-worm extruder at temperatures of about 250°C. The glass fibers and other additives are fed to the melt through a downstream port as described in U.S. Pat. No. 3,304,282. The amounts of the additives are listed in Table 1 below. The mixture is extruded through a die and the extrudate is granulated. The granules are injection molded to test specimens measuring 63.5 × 12.5 × 3.2 mm. The non-flammability is tested by the UL method 94, the vertically suspended specimens being flamed for 10 seconds with a bunsen flame. The burning period and dripping properties of 10 specimens are determined, the results being listed in Table 2 below.

TABLE 1

| Test | Additives present in molding composition |
|---|---|
| 1 | 30% of glass fibers |
| 2 | 30% of glass fibers |
|   | 8% of decabromodiphenyl oxide |
|   | 4% of antimony trioxide |
| 3 | 30% of glass fibers |
|   | 8% of decabromodiphenyl oxide |
|   | 4% of antimony trioxide |
|   | 4% of kaolin |
| 4 | 30% of glass fibers |
|   | 11% of an adduct of hexachloropentadiene with cyclo octadiene |
|   | 4% of antimony trioxide |
|   | 4% of calcined kaolin |
| 5 | 20% of glass fibers |
|   | 11% of the adduct used in test 4 |
|   | 4% of antimony trioxide |
|   | 4% of talcum |

TABLE 1-continued

| Test | Additives present in molding composition |
|---|---|
| 6 | 20% of glass fibers |
|   | 8% of red phosphorus |
|   | 4% of calcined kaolin |
| 7 | 20% of glass fibers |
|   | 8% of red phosphorus |
|   | 4% of silicic acid |

TABLE 2

| Test | metering properties of filler | burning time (seconds) | drop formation |
|---|---|---|---|
| 1 | — | burns up completely | yes |
| 2 | — | 10 | yes |
| 3 | good | 0 to 4 | no |
| 4 | good | 0 to 4 | no |
| 5 | good | 2 to 3 | no |
| 6 | good | 0 to 4 | no |
| 7 | bad | 0 to 25 | in parts |

Tests 3 to 6 are within the scope of the present invention.

Whereas the fillers used in the present invention may be easily metered, the colloidal silicic acid prepared by pyrolysis (Test 7) is difficult both to meter by means of proportioning scales and to introduce into the molten polymer. The test specimens are therefore very irregular in composition.

We claim:
1. Glass-fiber-reinforced molding compositions of reduced flammability consisting of
   A. a linear saturated polyester resin,
   B. from 10 to 60% by weight of glass fibers,
   C. from 3 to 30% by weight of a flame retardant and, additionally,
   D. from 2 to 10% by weight, based on the total weight of the molding composition, of a particulate water-insoluble silicate having a bulk density of more than 100 g/l.
2. A molding composition as set forth in claim 1 wherein said glass fibers have an average length of from 0.05 to 1 mm.
3. A molding composition as set forth in claim 1 wherein said glass fibers have an average length of from 0.10 to 0.4 mm and wherein said glass fibers are present in the amount of from 10 to 35% by weight based on the weight of the molding composition.
4. A molding composition as set forth in claim 3 wherein said flame retardant is present in an amount of from 5 to 15% by weight based on the weight of the molding composition.

* * * * *

UNITED STATES PATENT AND TRADEMARK OFFICE
CERTIFICATE OF CORRECTION

PATENT NO. : 3,963,669

DATED : June 15, 1976

INVENTOR(S) : Rolf Wurmb et al.

It is certified that error appears in the above-identified patent and that said Letters Patent are hereby corrected as shown below:

In the Abstract, Line 6, delete "... from 2 to 20 per cent..." and substitute --... from 2 to 10 per cent... --

Signed and Sealed this

Ninth Day of November 1976

[SEAL]

Attest:

RUTH C. MASON
Attesting Officer

C. MARSHALL DANN
Commissioner of Patents and Trademarks